United States Patent
Inui et al.

(10) Patent No.: US 10,266,725 B2
(45) Date of Patent: Apr. 23, 2019

(54) METHOD FOR PREPARING RECYCLED ABRASIVE SLURRY

(71) Applicant: KONICA MINOLTA, INC., Chiyoda-ku (JP)

(72) Inventors: Chie Inui, Hino (JP); Akihiro Maezawa, Hino (JP); Yuuki Nagai, Tachikawa (JP); Natsumi Hirayama, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 296 days.

(21) Appl. No.: 15/189,833

(22) Filed: Jun. 22, 2016

(65) Prior Publication Data
US 2016/0376468 A1    Dec. 29, 2016

(30) Foreign Application Priority Data
Jun. 23, 2015   (JP) .................. 2015-125258

(51) Int. Cl.
C09G 1/02    (2006.01)
B24B 57/02   (2006.01)

(52) U.S. Cl.
CPC ............... *C09G 1/02* (2013.01); *B24B 57/02* (2013.01); *Y02P 70/605* (2015.11)

(58) Field of Classification Search
CPC .......... C09G 1/02; B24B 57/02; Y02P 70/605
See application file for complete search history.

(56) References Cited

U.S. PATENT DOCUMENTS 8,557,134 B2 *  10/2013  Bosar .................. B44C 1/227
                                                    216/88
2009/0053981 A1 * 2/2009  Kozasa ............... B24B 37/0056
                                                    451/447

FOREIGN PATENT DOCUMENTS

| JP | 06-254764    | 9/1994 |
| JP | 2002-114967  | 4/2002 |
| JP | 2003-205460  | 7/2003 |
| JP | 2013-222863  | 10/2013 |
| JP | 2015-066656  | 4/2015 |

* cited by examiner

*Primary Examiner* — Pegah Parvini
(74) *Attorney, Agent, or Firm* — Cozen O'Connor (57) ABSTRACT

A method for preparing a recycled abrasive slurry includes: polishing a material to be polished, which includes silicon as a main component, with an abrasive slurry including a plurality of kinds of additives added for different purposes; and preparing a recycled abrasive slurry from a collected abrasive slurry collected after the polishing, wherein the recycled abrasive slurry is prepared through: step 1 of removing, from the collected abrasive slurry, at least an additive B capable of decreasing a polishing rate among the plurality of additives, and step 2 of replenishing at least an additive A capable of increasing a polishing rate among the plurality of additives, to the abrasive slurry from which an additive has been removed, which has been prepared in step 1.

6 Claims, 4 Drawing Sheets

METHOD FOR PREPARING RECYCLED ABRASIVE SLURRY

The entire disclosure of Japanese Patent Application No. 2015-125258 filed on Jun. 23, 2015 including description, claims, drawings, and abstract are incorporated herein by reference in its entirety.

BACKGROUND OF THE INVENTION

Field of the Invention

The present invention relates to a method for preparing a recycled abrasive slurry recycled from a collected abrasive slurry collected after a polishing process. More particularly, the present invention relates to a method for preparing a recycled abrasive slurry with excellent polishing properties by removing a component which affects a polishing rate from a collected abrasive slurry, and then replenishing at least a component which contributes to an increase in the polishing rate.

Description of the Related Art

As an abrasive for finely polishing optical glass or crystal oscillators in a finishing step, fine particles with high hardness represented by diamond, boron nitride, silicon carbide, alumina, alumina zirconia, zirconium oxide, cerium oxide have been conventionally used.

These abrasives are fine particles with high hardness, and therefore, used in large amounts for the purpose of mirror polishing, as an optical abrasive for electronic components such as optical lenses, semiconductor silicon substrates, crystal wafers, and glass plates of liquid crystal screens.

As a polishing method, a method is employed in which an abrasive slurry is interposed between an abrasive member such as an abrasive pad and a material to be polished, and polishing is performed.

When a content of a component derived from the material to be polished such as fine glass flakes is increased in the abrasive slurry by performing polishing, a polishing rate of the abrasive slurry is decreased. Therefore, the abrasive slurry is generally discarded after a certain period of use.

Major elements which constitute an abrasive used in polishing processing include rare metal obtained from minerals which poorly occur or do not occur at all in Japan. Rare metal is precious resources for which Japan is partly dependent on imports, is often expensive as a raw material, and is important resources used in large amounts as an abrasive. Accordingly, there is a strong demand for efficient use of precious resources by collecting an abrasive slurry used in a polishing step, and then recycling and using the abrasive slurry as a recycled abrasive slurry.

When an abrasive slurry used in a polishing step is collected and used as a recycled abrasive slurry, there are not so many cases where the collected slurry can be used as it is. Consequently, it is necessary to re-prepare the collected slurry to have a slurry composition most appropriate for polishing.

Regarding a recycled abrasive, for example, a method is disclosed in JP 2015-066656 A, which method includes: contacting positive ions of alkali metals or the like, and inorganic acids, with an abrasive used for glass polishing to remove adhered matter on a surface of the abrasive, thereby recycling the abrasive. In addition, as a method for removing a component derived from a material to be polished from a collected slurry when collecting an abrasive, JP 06-254764 A and JP 2003-205460 A disclose a method in which a dispersant or an electrolyte is added so as to dissolve a component derived from a material to be polished.

In an abrasive slurry, an abrasive (also referred to as abrasive grain) as a main component, an additive (hereinafter also referred to as additive A) as an auxiliary agent for improving a polishing rate such as a dispersion stabilizer for the abrasive during polishing and a detergent are included. In addition thereto, an antibacterial agent and a preservative such as those disclosed in JP 2002-114967 A and JP 2013-222863 A, and an additive such as an antifreezing agent are included from the viewpoint of maintaining stability in a storage period from the production of the abrasive slurry to the use thereof in polishing processing, and in transportation. Among the above additives, many of the additives for improving preservability have a function to decrease a polishing rate (hereinafter, an additive having a function to decrease a polishing rate is also referred to as additive B), and are unnecessary additives in a recycled abrasive slurry which is used, in many cases, immediately after it is recycled, from the viewpoint of maintaining or improving a polishing rate. On the other hand, in the methods for preparing a recycled abrasive slurry described in JP 2015-066656 A, JP 06-254764 A, and JP 2003-205460 A, additives having a function to increase a polishing rate represented by the additive A are simultaneously removed after recycling processing. Consequently, the methods have a problem that the polishing rate is decreased.

SUMMARY OF THE INVENTION

The present invention has been made in view of the above problems, and an object thereof is to provide a method for preparing a recycled abrasive slurry with excellent polishing properties, in which slurry, a component which decreases a polishing rate is reduced, and a component which improves a polishing rate is included at a desired concentration.

The present inventor has studied the cause of the problems in order to solve the problems, and in the process thereof, has found that a recycled abrasive slurry with excellent polishing properties and a high polishing rate can be obtained by a method for preparing a recycled abrasive slurry in which the recycled abrasive slurry is prepared through: step 1 of removing, from a collected abrasive slurry collected after a material to be polished is polished with an abrasive slurry including a plurality of kinds of additives added for different purposes, at least a component capable of decreasing a polishing rate among the additives, and step 2 of replenishing at least a component which increases a polishing rate to the abrasive slurry prepared in step 1. The finding has led to the present invention.

In other words, the problems are solved in the present invention by the following means.

1. To achieve the abovementioned object, according to an aspect, a method for preparing a recycled abrasive slurry reflecting one aspect of the present invention comprises: polishing a material to be polished, which includes silicon as a main component, with an abrasive slurry including a plurality of kinds of additives added for different purposes; and preparing a recycled abrasive slurry from a collected abrasive slurry collected after the polishing, wherein the recycled abrasive slurry is prepared through: step 1 of removing, from the collected abrasive slurry, at least an additive B capable of decreasing a polishing rate among the plurality of additives, and step 2 of replenishing at least an additive A capable of increasing a polishing rate among the plurality of additives, to the abrasive slurry from which an additive has been removed, which has been prepared in step 1.

2. The method for preparing a recycled abrasive slurry according to Item. 1, wherein the additive A and the additive B are preferably removed in step 1 to the extent that the contents thereof are reduced to be in a range of 1/500 to 1/2 of respective contents thereof in the abrasive slurry before collection.

3. The method for preparing a recycled abrasive slurry according to Item. 1 or 2, wherein an amount of the additive A replenished in step 2 is preferably in a range of 10% by mass to 5000% by mass with respect to the amount of the additive A included in the abrasive slurry before collection.

4. The method for preparing a recycled abrasive slurry according to any one of Items. 1 to 3, wherein the additive A is preferably a dispersant or a detergency improver.

5. The method for preparing a recycled abrasive slurry according to any one of Items. 1 to 4, wherein the additive B is preferably a preservative, a rust preventive agent, or an antibacterial agent.

6. The method for preparing a recycled abrasive slurry according to any one of Items. 1 to 5, wherein an amount of the additive A replenished in step 2 is preferably determined based on a measured value of electrical conductivity of the abrasive slurry from which an additive has been removed.

7. The method for preparing a recycled abrasive slurry according to any one of Items. 1 to 6, wherein the additive A is preferably added in step 2 to the abrasive slurry from which an additive has been removed under a condition that a value of electrical conductivity of the recycled abrasive slurry is adjusted to be in a range of 0.05 to 100 times greater than a value of electrical conductivity of the abrasive slurry before collection.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

A method for preparing a recycled abrasive slurry according to an embodiment of the present invention is a method including polishing a material to be polished, which includes silicon as a main component, with an abrasive slurry including a plurality of kinds of additives added for different purposes, and preparing a recycled abrasive slurry from a collected abrasive slurry collected after the polishing. In the method, the recycled abrasive slurry is prepared through step 1 of removing, from the collected abrasive slurry, at least an additive B capable of decreasing a polishing rate among the plurality of additives, and step 2 of replenishing at least an additive A capable of increasing a polishing rate among the plurality of additives, to the abrasive slurry from which an additive has been removed, which has been prepared in step 1. Embodiments according to a first to fifth aspects of the invention have this technical feature in common.

As an embodiment of the present invention, it is preferable to remove, in step 1, the additive A and the additive B to the extent that the contents thereof are reduced to be in a range of 1/500 to 1/2 of each of the contents thereof in the abrasive slurry before collection, from the viewpoints that the desired effects of the invention are further exerted, and that the additives can be efficiently removed from the collected abrasive slurry without leaving a significant effect on the productivity.

In addition, by setting the amount of the additive A replenished in step 2 to be in a range of 10% by mass to 5000% by mass with respect to the amount of the additive A included in the abrasive slurry before collection, the same polishing performance (polishing rate) as that of a fresh, new abrasive slurry, can be obtained even with a recycled abrasive slurry.

Furthermore, from the viewpoint that excellent polishing performance can be obtained, it is preferable to apply a dispersant or a detergency improver as the additive A.

In addition, a preferable aspect includes an aspect where the amount of the additive A replenished in step 2 is determined in accordance with a measured value of electrical conductivity of the abrasive slurry from which an additive has been removed, or where the additive A is added in step 2 to the abrasive slurry from which an additive has been removed under a condition that a value of electrical conductivity of the recycled abrasive slurry is adjusted to be in a range of 0.05 to 100 times greater than a value of electrical conductivity of the abrasive slurry before collection.

Hereinbelow, the present invention and constitutional elements thereof, and embodiments and aspects for carrying out the present invention will be described in detail. The term "to" in the present invention is used to include numerical values described before and after the term as a lower limit and an upper limit, respectively.

Summary of Method for Preparing Recycled Abrasive Slurry

A method for preparing a recycled abrasive slurry according to an embodiment of the present invention is a method including, polishing a material to be polished, which includes silicon as a main component, with an abrasive slurry including a plurality of kinds of additives added for different purposes, and preparing a recycled abrasive slurry from a collected abrasive slurry collected after the polishing. In the method, the recycled abrasive slurry is prepared through step 1 of removing, from the collected abrasive slurry, at least an additive B capable of decreasing a polishing rate among the plurality of additives, and step 2 of replenishing at least an additive A capable of increasing a polishing rate among the plurality of additives, to the abrasive slurry from which an additive has been removed, which has been prepared in step 1.

In the present invention, an "additive capable of increasing a polishing rate" and an "additive capable of decreasing a polishing rate" are defined as a compound which satisfies the conditions established as follows.

Regarding specific compounds of each additive, details will be described later.

First, with the use of a reference abrasive slurry 1 obtained by dispersing only abrasive particles in water at a concentration of 1.0% by mass, polishing rate 1 is measured in accordance with the following method.

Measurement of Polishing Rate

With a polishing machine illustrated in FIG. 1, of which details will be described later, a surface to be polished is polished with an abrasive cloth while supplying an abrasive slurry to the surface to be polished. The abrasive slurry was prepared by using water only as a dispersion medium, and the concentration thereof was adjusted to be 1.0% by mass. In a polishing test, the abrasive slurry was supplied in a circulatory manner at a flow rate of 5 L/min to perform polishing processing. A glass substrate having a thickness of 65 mm was used as an object to be polished, and an abrasive cloth made from polyurethane was used. Pressure against the surface to be polished upon polishing was adjusted to be 9.8 kPa (100 g/cm$^2$), the rotation speed of the polishing machine was set to 100 min$^{-1}$ (rpm), and then polishing processing was performed for 30 minutes. The thickness of the glass substrate, before and after the polishing, was measured with a Nikon Digimicro (MF501), a polishing amount per minute (μm) was calculated from thickness displacement, and used as polishing rate 1.

Next, an abrasive slurry 2 to be measured is prepared which includes the additive A or the additive B to be measured at a concentration of 0.02% by mass, and the abrasive at a concentration of 1.0% by mass, and polishing rate 2 is measured by the same method as that described above.

Next, a polishing rate ratio (polishing rate 2/polishing rate 1) is obtained from each of obtained polishing rates. When the polishing rate ratio is less than 1.00, the additive is defined as an additive capable of decreasing a polishing rate, and when the polishing rate ratio is 1.02 or greater, the additive is defined as an additive capable of increasing a polishing rate. The polishing rate ratio of the additive capable of increasing a polishing rate is preferably 1.05 or greater, and more preferably 1.10 or greater.

Preparation flow of Recycled Abrasive Slurry Collection of Spent Abrasive

First, with the use of FIG. 1, a description will be given for a flow of processes for collecting a slurry which includes a spent abrasive after polishing in a polishing step of a material to be polished.

Figure 1:
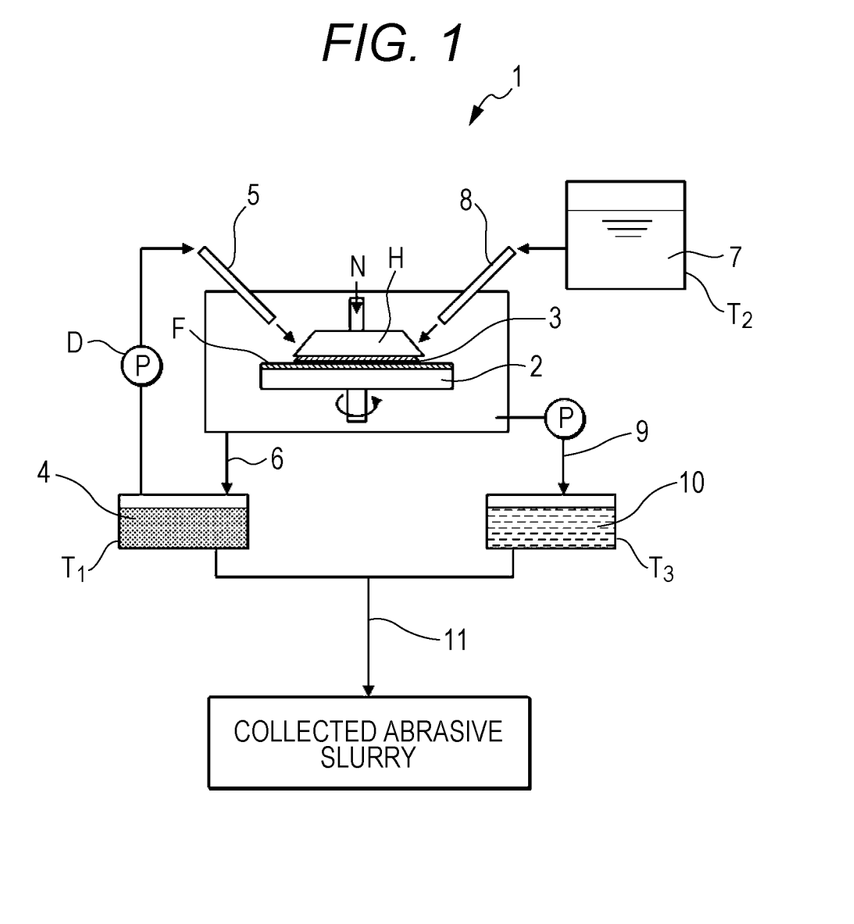
FIG. 1 is a schematic diagram illustrating an example of a flow of processes including discharge of a spent abrasive slurry from a polishing step and collection of the abrasive slurry.

FIG. 1 is a schematic diagram illustrating an example of a flow of processes including discharge of a spent abrasive slurry from a polishing step and collection of the abrasive slurry.

For example, in a case where a glass lens is polished, one polishing step generally includes preparation of an abrasive slurry, polishing processing, and rinsing of a polishing portion.

Regarding an overall flow of the polishing step illustrated in FIG. 1, the polishing machine 1 includes a polishing surface plate 2 to which an abrasive cloth F is stuck. The abrasive cloth F is constituted by non-woven fabric, synthetic resin foam, artificial leather, or the like. The polishing surface plate 2 is rotatably arranged.

In a polishing operation, while pressing a material to be polished 3 including silicon as a main component against the polishing surface plate 2 at a predetermined pressing force N with a rotatable holder H, the polishing surface plate 2 and the holder H are rotated. At the same time, an abrasive liquid 4 (abrasive slurry) prepared in advance is supplied from a slurry nozzle 5 through a pump D. The spent abrasive liquid 4 (abrasive slurry including the spent abrasive) is stored in a slurry tank T1 through a channel 6, and repeatedly circulating between the polishing machine 1 and the slurry tank T1.

In addition, if needed, rinse water 7 for rinsing the polishing machine 1 is stored in a rinse water storing tank T2, is sprayed from a rinse water spray nozzle 8 to a polishing portion to perform rinsing, and is stored as a rinse liquid 10 including the abrasive (abrasive slurry including the spent abrasive) in a rinse liquid storing tank T3 through a pump and a channel 9.

The rinse liquid storing tank T3 is a tank for storing rinse water after it is used in rinsing. In order to prevent precipitation and aggregation from occurring, the inside of the rinse liquid storing tank T3 is constantly stirred by a stirring blade.

The abrasive liquid 4 is generated by performing polishing, stored in the slurry tank T1, and then circulated and used. The rinse liquid 10 is stored in the rinse liquid storing tank T3 and includes the abrasive. The abrasive liquid 4 and the rinse liquid 10 include, together with abrasive particles, a glass component derived from the material to be polished (particles of the material to be polished) which has been shaved off from the material to be polished 3 which has been polished, and fractions of the abrasive cloth F.

Polishing Step

A specific method employed in a polishing step will be described.

(1) Preparation of Abrasive Slurry

Abrasive powder is added to a solvent such as water and dispersed therein such that the concentration is adjusted to be in a range of 0.5% by mass to 40% by mass, and an additive A capable of increasing a polishing rate and an additive B capable of decreasing a polishing rate are added thereto, thereby preparing a new abrasive slurry. The abrasive slurry is supplied to the polishing machine 1 in a circulatory manner as illustrated in FIG. 1, and used. Regarding the size of particles used as an abrasive, particles having an average particle diameter of several tens of nanometers to several micrometers are used.

(2) Polishing

As illustrated in FIG. 1, an abrasive pad (abrasive cloth F) and the material to be polished 3 are brought into contact with each other and the abrasive cloth F and the material to be polished 3 are relatively moved under pressurizing conditions while an abrasive slurry is supplied to the contact surface.

A large amount of the abrasive is adhered to the material to be polished 3 immediately after it is polished and the polishing machine 1. Consequently, water or the like is supplied instead of the abrasive slurry after polishing to rinse off the abrasive adhered to the material to be polished 3 and the polishing machine 1. At that time, the rinse liquid 10 including the abrasive is discharged to the channel 9.

Since a certain amount of the abrasive is discharged to the channel 9 by this rinsing operation, the amount of the abrasive in a system is decreased. In order to compensate the decrease in the amount thereof, a new abrasive slurry is added to the slurry tank T1. Regarding the addition method, addition may be performed for each processing, or for each time a certain amount of the processing is finished.

Spent Abrasive Slurry

In the present invention, the term "spent abrasive slurry" means an abrasive slurry stored in the rinse liquid storing tank T3, and an abrasive slurry discharged outside the system of polishing step including the polishing machine 1, the slurry tank T1, and the rinse water storing tank T2. There are two main types thereof as follows.

One is an abrasive slurry (rinse slurry) stored in the rinse liquid storing tank T3 which includes a rinse liquid discharged in the rinsing operation. Another is a spent abrasive slurry (life-ended slurry) stored in the slurry tank T1, which is discarded after it is used predetermined times of processing.

Slurry Collection Step

A slurry collection step is a step for collecting an abrasive slurry including a spent abrasive.

As described above, in the slurry collection step, the rinse slurry and/or the life-ended slurry is collected.

The abrasive slurry thus collected (collected abrasive slurry) includes the abrasive in a range of about 0.1% by mass to 20% by mass.

Method for Preparing Recycled Abrasive Slurry

Method for Collecting and Recycling Abrasive

The method for collecting a spent abrasive slurry to prepare a recycled abrasive slurry may include at least an additive removal step (step 1) of removing, from the collected abrasive slurry, the additive A capable of increasing a polishing rate and the additive B capable of decreasing a polishing rate, and an additive A addition step (step 2) of adding the additive A capable of increasing a polishing rate to the abrasive slurry from which additives have been removed, which has been prepared in step 1. However, preferably, the method further includes a foreign matter removal step, a dissolution step, and a concentration step. In addition, it is preferable to repeatedly perform the dissolution step and the additive removal step, and then perform the additive A addition step (step 2).

Figure 2:
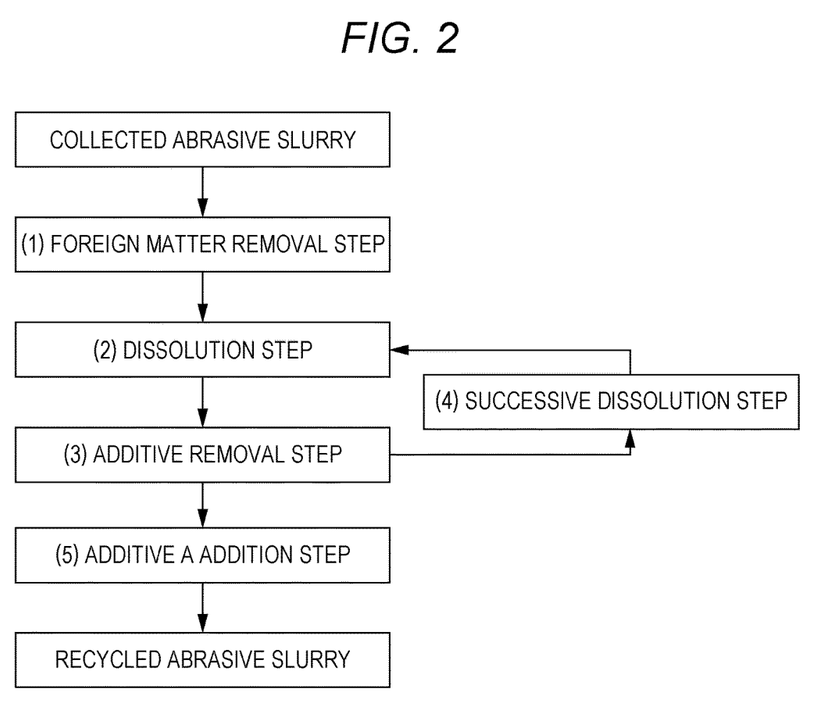
FIG. 2 is a flowchart illustrating an example of a method for obtaining a recycled abrasive slurry from a collected abrasive slurry.

FIG. 2 is a flowchart illustrating an example of a method for obtaining a recycled abrasive slurry from a collected abrasive slurry.

1. Foreign Matter Removal Step

Rinse water and a spent abrasive slurry are included in an abrasive slurry (collected abrasive slurry) discharged from a system including a polishing machine and a slurry tank.

In a foreign matter removal step, foreign matter such as an abrasive pad is removed by using a filter of 20 μm to 100 μm.

2. Dissolution Step for Component Derived from Material to be Polished

Figure 3:
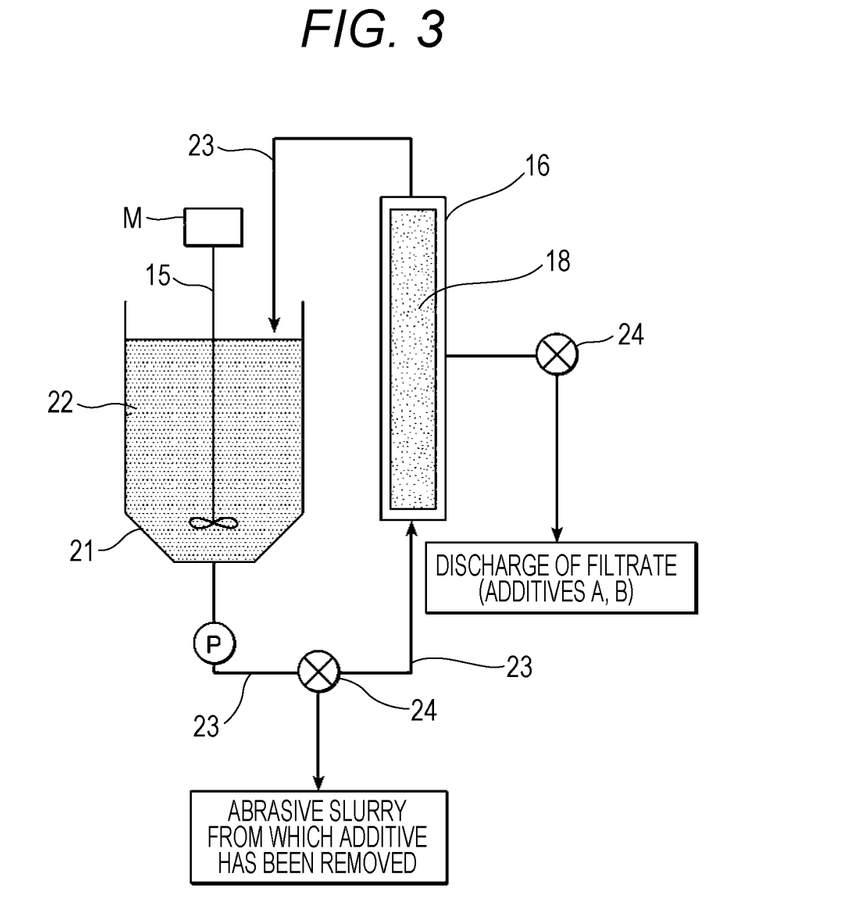
FIG. 3 is a schematic diagram illustrating an example of a filtration device used in step 1 for preparing, from a collected slurry, an abrasive slurry from which an additive has been removed.

Next, as illustrated in FIG. 3, a collected slurry 22 from which foreign matter has been removed in the foreign matter removal step is introduced into a tank 21 in a filtration device equipped with a temperature regulating unit.

Then, a solvent is added to the collected slurry, followed by stirring with a stirrer 15, thereby dissolving a component derived from the material to be polished. A main component of the added solvent is water.

It is preferable to heat the collected abrasive slurry in the tank, and particularly preferable to heat the collected abrasive slurry to be in a range of 40° C. to 90° C.

Dissolution of the component derived from the material to be polished proceeds by the addition of the solvent, and optionally, the heating. On the other hand, since an abrasive component is insoluble in the solvent, the abrasive component can be separated by a filter.

3. Additive Removal Step

The collected abrasive slurry in which the component derived from the material to be polished has been dissolved in the dissolution step is filtered with a filter 16, and thereby the additive A capable of increasing a polishing rate and the additive B capable of decreasing a polishing rate are discharged from the collected abrasive slurry to the outside of the system.

The filter used for the filtration is not particularly limited. Examples thereof include a hollow fiber filter, a metal filter, a yarn wound filter, a ceramic filter, and a roll-type polypropylene filter.

Preferable examples of a ceramic filter applicable to the present invention include a ceramic filter manufactured by TAMI Industries in France, a ceramic filter manufactured by Noritake Co., Limited, a ceramic filter manufactured by NGK INSULATORS. LTD. (for example, CERALLEC DPF and Cefilt).

It is also preferable to perform a filtration step before the dissolution step so as to perform the dissolution step after separating a filtrate. By doing so, the component derived from the material to be polished can be efficiently removed.

4. Successive Dissolution Step

Specifically, the dissolution step and the additive removal step described in the above (2) and (3), respectively, are successively performed over a predetermined period of time while circulating the abrasive slurry through a circulation pipe 23. Subsequently, when the concentrations of the additive A capable of increasing a polishing rate and the additive B capable of decreasing a polishing rate have been decreased to a predetermined concentration with respect to the concentration of the abrasive in the abrasive slurry, a three-way valve 24 is switched to a discharge side so that the abrasive slurry from which additives have been removed is discharged outside the system and collected.

Regarding the concentration of each additive with respect to the amount of the abrasive in the abrasive slurry from which additives have been removed, it is preferable to remove each abrasive to the extent that the content thereof is reduced to be in a range of $1/500$ to $1/2$ of that of each additive with respect to the abrasive in a new abrasive slurry, thereby achieving a low concentration.

In the present invention, the content of each additive in the abrasive slurry can be quantified with the use of, for example, high-performance liquid chromatography (HPLC).

5. Additive A Addition Step

Next, a replenish amount of the additive A to be replenished to the abrasive slurry from which additives have been removed, which has been prepared in the above step, is determined. The replenish amount is determined as follows. Electrical conductivity of the abrasive slurry from which additives have been removed is measured, and the replenish amount is determined in accordance with the measured value. With regard to the replenish amount of the additive A in step 2, it is preferable to add the additive A to the abrasive slurry from which additives have been removed such that the value of the electrical conductivity of the recycled abrasive slurry as a final product is adjusted to be in a range of 0.05 to 100 times greater than the value of electrical conductivity of an abrasive slurry before collection, which is a new slurry before use.

In a manner as described above, the additive A having an effect of improving a polishing rate is replenished to prepare the recycled abrasive slurry.

The electrical conductivity can be measured, for a sample solution of which the temperature has been controlled to be 25° C., with a conductivity meter. Examples thereof include a conductivity meter (ES-51, manufactured by HORIBA, Ltd.), a conductivity meter (CM-30G, manufactured by DKK-TOA CORPORATION), a hand-held conductivity meter (CyberScan CON 110 manufactured by AS ONE Corporation), and a compact conductivity meter (LAQUAtwin B-771, manufactured by HORIBA, Ltd.).

At that time, the additive A is preferably replenished such that an amount of the additive A replenished is in a range of 10% by mass to 5000% by mass with respect to the content of the additive A based on an amount of an abrasive included in a new abrasive slurry, in other words, is in a concentration range of 0.1 to 50 times greater than the content of the additive A in a new abrasive slurry.

For example, in a case where a new abrasive slurry includes 1.0% by mass of the abrasive and 0.02% by mass of the additive A, it is preferable to prepare the recycled abrasive slurry as follows: when the concentration of the abrasive is 1.0% by mass, the additive A is added such that the concentration thereof is in a range of 0.002% by mass to 1.00% by mass.

Figure 4:
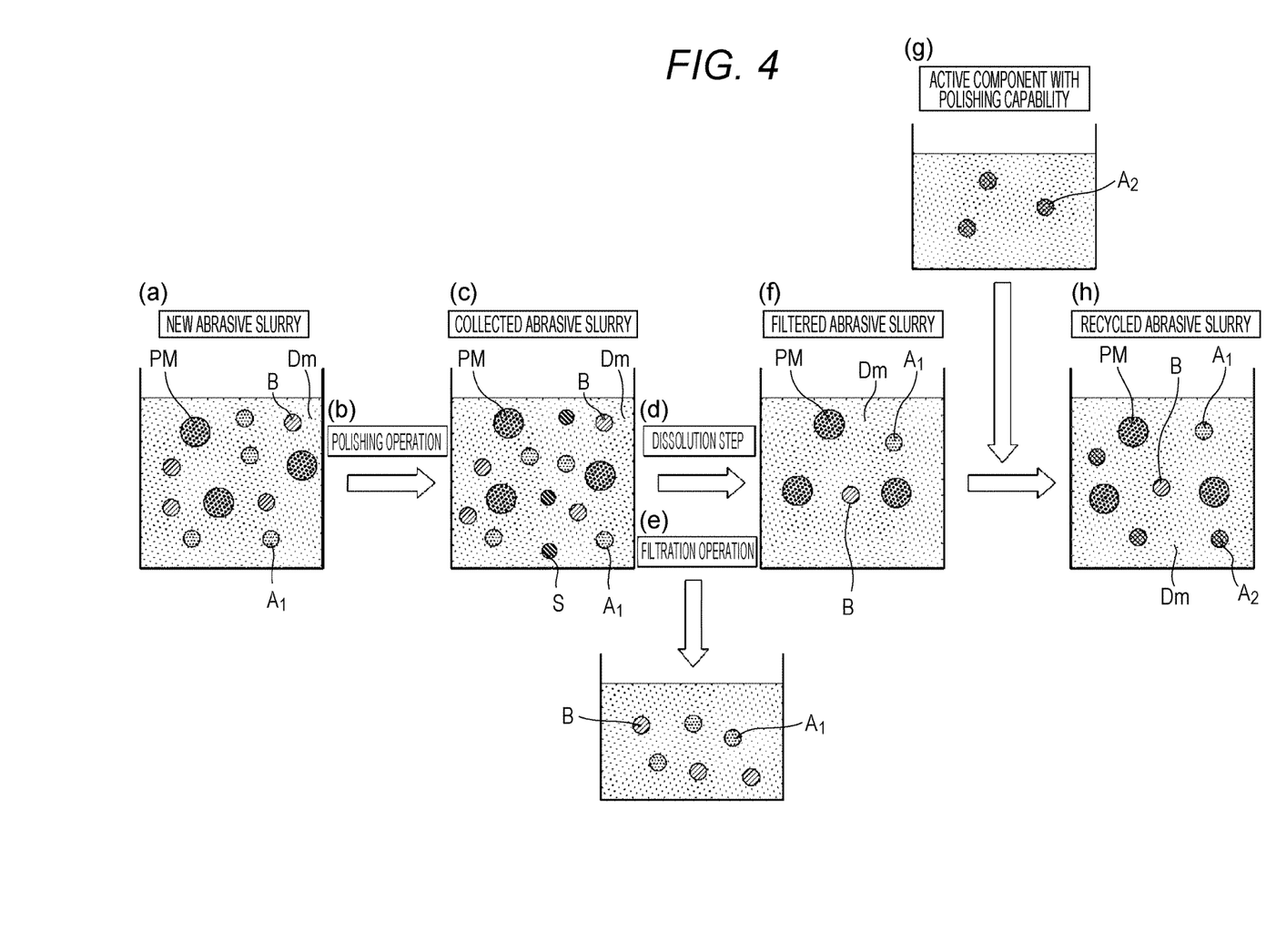
FIG. 4 is a schematic diagram illustrating constitutional materials in an abrasive slurry in a method for preparing a recycled abrasive slurry from a new slurry.

Preparation Flow of Recycled Abrasive Slurry and Balance of Constitutional Elements in Each Step FIG. 4 is a schematic diagram chronologically illustrating constitutional elements in each abrasive slurry described above, from a new abrasive slurry to a recycled abrasive slurry prepared therefrom.

In FIG. 4, (a) schematically illustrates a composition of the new abrasive slurry (before collection). A liquid medium Dm (mainly, water) includes, in addition to an abrasive (abrasive grains) PM as a main material, an additive $A_1$ capable of increasing a polishing rate, and the additive B capable of decreasing a polishing rate. The additive B is represented by a preservative and an antibacterial agent for securing storage stability of the abrasive slurry in a period from the preparation of the abrasive slurry to the use thereof in a polishing step.

The new abrasive slurry (a) is used in a polishing operation (b) for polishing a material to be polished. Then, a collected abrasive slurry (c) is obtained in accordance with the flow of processes for collecting the abrasive slurry illustrated in FIG. 1. The collected abrasive slurry (c) includes powder S derived from the material to be polished, which is a polished residue generated in the polishing operation (b), in addition to the composition of the new abrasive slurry (a).

Next, the powder S derived from the material to be polished is dissolved in the dissolution step (d). Then, a filtered abrasive slurry (f) is prepared from the collected abrasive slurry (c) with the filtration device described with reference to FIG. 3 through a filtration operation (e). In the filtration operation (e), the additive $A_1$ and the additive B are removed to the extent that the concentrations thereof are reduced to be in a range of 1/500 to 1/2 of the initial concentrations. The filtered abrasive slurry (f) includes, in addition to the abrasive PM as a main component, the additive $A_1$ and the additive B of which concentrations have been significantly reduced in the liquid medium Dm.

Then, in a recycled abrasive slurry preparation step, which is a final step, the recycled abrasive slurry is prepared as follows. Among the additives removed by the filtration operation (e), only the additive A capable of increasing a polishing rate is replenished in an amount in a range of 10% by mass to 5000% by mass with respect to the content of the additive A included in the new abrasive slurry. The feature of the recycled abrasive slurry resides in its composition in which the abrasive PM and the additive A capable of increasing a polishing rate each has a concentration approximated to that in the new abrasive slurry, and only the additive B which decreases a polishing rate has a significantly reduced concentration in comparison to that in the new abrasive slurry.

In this operation, the additive $A_1$ capable of increasing a polishing rate included in the new abrasive slurry and an additive $A_2$ capable of increasing a polishing rate which is added in step (g), illustrated in FIG. 4, may be the same compounds or different compounds from each other.

Constitutional Materials of Abrasive Slurry

Next, main constitutional materials of the abrasive slurry according to an embodiment of the present invention will be described in detail.

Abrasive

In general, as an abrasive for optical glass, a semiconductor substrate, and the like, a slurry obtained by dispersing fine particles in water or oil is used. Examples of the fine particles include those of colcothar ($\alpha Fe_2O_3$), cerium oxide, aluminum oxide, manganese oxide, zirconium oxide, and colloidal silica.

In order to obtain a sufficient processing speed while maintaining flatness with high accuracy in polishing processing of a surface of a semiconductor substrate and glass, the recycled abrasive slurry according to an embodiment of the present invention is preferably applied to collection of an abrasive selected from diamond, boron nitride, silicon carbide, alumina, alumina zirconia, and zirconium oxide. These abrasives are applicable to chemical mechanical polishing (CMP), in which polishing is performed by both of physical action and chemical action.

Examples of the abrasive according to an embodiment of the present invention include the followings: synthetic diamond and mined diamond as a diamond abrasive; and cubic boron nitride BN (for example, a product manufactured by Showa Denko K.K.) as a boron nitride abrasive. The boron nitride abrasive is the second hardest abrasive next to diamond. Examples of the silicon carbide abrasive include a silicon carbide abrasive, a green silicon carbide abrasive, and a black silicon carbide abrasive. Examples of the alumina abrasive include, besides an alumina abrasive, a brown alumina abrasive, a white alumina abrasive, a rose-pink alumina abrasive, a pulverized alumina abrasive, and an alumina zirconia abrasive. As zirconium oxide, BR series zirconium oxide for abrasives manufactured by Daiichi Kigenso Kagaku Kogyo Co., Ltd. is exemplified.

The component and shape of the abrasive used in an embodiment of the present invention are not particularly limited, and those commercially available as an abrasive in general may be used.

Additive

The additive included in the abrasive slurry according to an embodiment of the present invention is roughly divided into an additive A capable of increasing a polishing rate, and an additive B capable of decreasing a polishing rate.

The definition of each of the additive A capable of increasing a polishing rate and the additive B capable of decreasing a polishing rate in the present invention is as described above. For an abrasive slurry including a predetermined concentration of an abrasive, a rate of change of polishing rate caused by the presence of the additive is measured. In a case where a polishing rate in a system without the additive is set as polishing rate 1, and a polishing rate in a system including a predetermined concentration of the additive is set as polishing rate 2, when a polishing rate ratio (polishing rate 2/polishing rate 1) is 1.00 or greater, the additive used therein is defined as the additive A capable of increasing a polishing rate, and when a polishing rate ratio (polishing rate 2/polishing rate 1) is less than 1.00, the additive used therein is defined as the additive B capable of decreasing a polishing rate.

Additive A: Additive Capable of Increasing Polishing Rate

The additive A is an additive capable of increasing a polishing rate, and the polishing rate ratio (polishing rate 2/polishing rate 1) is 1.02 or greater, preferably 1.05 or greater, more preferably 1.10 or greater.

The additive A applicable to the present invention is an additive having a function of increasing polishing efficiency, and major examples thereof include:
(1) a dispersant which improves dispersion stability of abrasive particles;
(2) $SiO_2/Si_3N_4$ film selectivity improver which improves a polishing rate of a $SiO_2$ film with respect to a polishing rate of a $Si_3N_4$ film; and
(3) a detergent having a detergency improving effect.

Hereinbelow, representative compounds of the additive A applicable to the present invention are listed, but not limited to the compounds exemplified herein.

Dispersant

Examples of the dispersant include a water-soluble anionic dispersant, a water-soluble nonionic dispersant, a water-soluble cationic dispersant, and a water-soluble amphoteric dispersant. As a dispersant, a polymer including ammonium salt of acrylic acid as a copolymerization component is preferable. Examples thereof include ammonium polyacrylate, a copolymer of acrylamide and ammonium acrylate.

In addition, two or more kinds of dispersants may be used in combination, which include at least one kind of polymer dispersant including ammonium salt of acrylic acid as a copolymerization component, and at least one kind of dispersant selected from the water-soluble anionic dispersant, the water-soluble nonionic dispersant, the water-soluble cationic dispersant, and the water-soluble amphoteric dispersant.

Since the dispersant is used for polishing performed in the manufacture of semiconductor elements, it is preferable to suppress the content of alkali metals such as sodium ions and potassium ions in the dispersant to be 10 ppm or less.

Anionic Dispersant

Examples of the anionic dispersant include triethanolamine lauryl sulfate, ammonium lauryl sulfate, polyoxyethylene alkyl ether sulfate triethanolamine, and polycarboxylic acid-type polymer dispersant.

Examples of the polycarboxylic acid-type polymer dispersant include: a polymer of carboxylic acid monomers having an unsaturated double bond such as acrylic acid, methacrylic acid, maleic acid, fumaric acid, and itaconic acid; a copolymer of a carboxylic acid monomer having an unsaturated double bond and other monomer having an unsaturated double bond; and ammonium salts and amine salts thereof.

Cationic Dispersant

Examples of the cationic dispersant include primary to tertiary aliphatic amines, quaternary ammonium, tetraalkyl ammonium, trialkyl benzyl ammonium alkyl pyridinium, 2-alkyl-1-alkyl-1-hydroxyethyl imidazolinium, N,N-dialkyl morpholinium, polyethylene polyamine fatty acid amide, urea condensate of polyethylene polyamine fatty acid amide, quaternary ammonium of urea condensate of polyethylene polyamine fatty acid amide, and salts thereof.

Nonionic Dispersant

Examples of the nonionic dispersant include polyoxyethylene lauryl ether, polyoxyethylene cetyl ether, polyoxyethylene stearyl ether, polyoxyethylene oleyl ether, polyoxyethylene higher alcohol ether, polyoxyethylene octyl phenyl ether, polyoxyethylene nonyl phenyl ether, polyoxyalkylene alkyl ether, polyoxyethylene derivative, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene sorbitol tetraoleate, polyethylene glycol monolaurate, polyethylene glycol monostearate, polyethylene glycol distearate, polyethylene glycol monooleate, polyoxyethylene alkylamine, polyoxyethylene hydrogenated castor oil, 2-hydroxyethyl methacrylate, and alkylalkanolamide.

Betaine-Type Dispersant

As a betaine-type dispersant, followings are exemplified: betaines such as N,N-dimethyl-N-alkyl-N-carboxymethyl ammonium betaine, N,N,N-trialkyl-N-sulfoalkylene ammonium betaine, N,N-dialkyl-N,N-bispolyoxyethylene ammonium sulfate ester betaine, 2-alkyl-1-carboxymethyl-1-hydroxyethyl imidazolinium betaine; and aminocarboxylic acids such as N,N-dialkylaminoalkylene carboxylate.

Amount of Dispersant Added

In view of the relationship between an amount of a dispersant added and dispersibility and anti-sedimentation property of abrasive particles in the abrasive slurry, and polishing flaws, the amount of these dispersants added is preferably in a range of 0.01 parts by mass to 2.0 parts by mass with respect to 100 parts by mass of cerium oxide particles in a case where the abrasive is cerium oxide. Molecular weight of the dispersant is preferably in a range of 100 to 50000, and more preferably 1000 to 10000. When the molecular weight of the dispersant is 100 or more, a sufficient polishing rate can be obtained in polishing a silicon oxide film or a silicon nitride film. When the molecular weight of the dispersant is 50000 or less, it is possible to suppress an increase in the viscosity thereof to secure storage stability of a CMP abrasive.

In order to disperse these abrasive particles in water, in addition to a dispersion process using a general stirrer, a homogenizer, an ultrasonic disperser, or wet-type ball mill can be used. An average particle diameter of the abrasive particles in the abrasive slurry thus prepared is preferably in a range of 0.01 µm to 1.0 µm. When the average diameter of the abrasive particles is 0.01 µm or greater, a high polishing rate can be obtained, and when the average particle diameter of the abrasive particles is 1.0 µm or less, it is possible to prevent a surface of a film to be polished from being scratched in polishing.

Polishing Rate Selectivity Improver

As the additive A, a polishing rate selectivity improver can be applied to the abrasive slurry according to an embodiment of the present invention.

Improvement in a polishing rate selectivity referred to in the present invention means improvement in a ratio (hereinafter also referred to as selectivity) of a polishing rate of the silicon nitride film ($Si_3N_4$) to a polishing rate of the silicon oxide film ($SiO_2$).

In the present invention, an organic cationic compound is preferable as the polishing rate selectivity improver from the viewpoint that the ratio of a polishing rate of the silicon nitride film to a polishing rate of the silicon oxide film can be improved.

As the organic cationic compound, those including a nitrogen atom are preferable, and compounds including an amino group or a quaternary ammonium group are preferable. Molecular weight of the organic cationic compound is preferably 30 to 10000, more preferably 30 to 1000, still more preferably 30 to 200, and most preferably 40 to 120, from the viewpoint of water solubility.

The compound including an amino group may include one or more amino groups in one molecule, and the number of amino groups is preferably 1 to 20, more preferably 1 to 10, still more preferably 1 to 5, and most preferably 1 to 3, from the viewpoint of water solubility. A ratio of the number of carbon atoms to the number of nitrogen atoms (C/N ratio) included in one molecule of the compound including an amino group is preferably 1 to 20, more preferably 1 to 10, still more preferably 1 to 6, and most preferably 1 to 4, from the viewpoint of water solubility. However, the same is not applied to ethanolamine compounds.

Examples of specific compounds serving as each of the polishing rate selectivity improvers include monoamine, polyamine, amine including an OH group, and amine including an ether group of primary amine, secondary amine, and tertiary amine, and a heterocyclic compound including a nitrogen atom, a compound including a quaternary ammonium group, which are described in JP 2002-114967A, JP 2002-118082 A, JP 2002-201462 A, JP 2004-269577 A, and JP 2004-273547 A.

Among these, ethylamine, propylamine, isopropylamine, butylamine, and ethylenediamine are particularly preferable.

Detergent

In the present invention, it is preferable to use a detergent as one of the additive A, and particularly preferable to use an alcoholic compound as the detergent.

Examples of the alcoholic compound as the detergent applicable to the present invention include alcohols, such as 1-propanol, 2-propanol, 2-propyn-1-ol, allyl alcohol, ethylene cyanohydrin, 1-butanol, 2-butanol, (S)-(+)-2-butanol, 2-methyl-1-propanol, t-butyl alcohol, perfluoro-t-butyl alcohol, crotyl alcohol, 1-pentanol, 2,2-dimethyl-1-propanol, 2-methyl-2-butanol, 3-methyl-1-butanol, S-amyl alcohol, 1-hexanol, 4-hydroxy-4-methyl-2-pentanone, 4-methyl-2-pentanol, cyclohexanol, DL-3-hexyl alcohol, 1-heptanol, 2-ethyl hexyl alcohol, (S)-(+)-2-octanol, 1-octanol, DL-3-octyl alcohol, 2-hydroxybenzyl alcohol, 2-nitrobenzyl alcohol, 3,5-dihydroxybenzyl alcohol, 3,5-dinitrobenzyl alcohol, 3-fluorobenzyl alcohol, 3-hydroxybenzyl alcohol, 4-fluorobenzyl alcohol, 4-hydroxybenzyl alcohol, benzyl alcohol, m-(trifluoromethyl)benzyl alcohol, m-aminobenzyl alcohol, m-nitrobenzyl alcohol, o-aminobenzyl alcohol, o-hydroxybenzyl alcohol, p-hydroxybenzyl alcohol, p-nitrobenzyl alcohol, 2-(p-fluorophenyl)ethanol, 2-aminophenethyl alcohol, 2-methoxybenzyl alcohol, 2-methyl-3-nitrobenzyl alcohol, 2-methyl benzyl alcohol, 2-nitrophenethyl alcohol, 2-phenyl ethanol, 3,4-dimethyl benzyl alcohol, 3-methyl-2-nitrobenzyl alcohol, 3-methyl-4-nitrobenzyl alcohol, 3-methyl benzyl alcohol, 4-fluorophenethyl alcohol, 4-hydroxy-3-methoxybenzyl alcohol, 4-methoxybenzyl alcohol, 4-methyl-3-nitrobenzyl alcohol, 5-methyl-2-nitrobenzyl alcohol, DL-α-hydroxyethyl benzene, o-(trifluoromethyl) benzyl alcohol, p-(trifluoromethyl)benzyl alcohol, p-aminophenethyl alcohol, p-hydroxyphenyl ethanol, p-methylbenzyl alcohol, and S-phenethyl alcohol; and phenols, such as 4-methylphenol, 4-ethylphenol, and 4-propylphenol.

Additive B: Additive Capable of Decreasing Polishing Rate

The additive B referred to in the present invention is an additive capable of decreasing a polishing rate, and the polishing rate ratio (polishing rate 2/polishing rate 1) is less than 1.00.

As described above, the additive B is an additive for imparting storage stability of the abrasive slurry in a period from the preparation of the abrasive slurry to the use thereof in a polishing step, and is an unnecessary additive in the recycled abrasive slurry.

As a compound falling under the category of the additive B, a preservative and an antibacterial agent are mainly exemplified.

Preservative

Examples of the preservative include benzalkonium chloride, benzethonium chloride, 1,2-benzisothiazolin-3-one, (5-chloro)2-methyl-4-isothiazolin-3-one, hydrogen peroxide, and hypochlorous acid.

Antibacterial Agent

As the antibacterial agent, a quaternary ammonium salt-type antibacterial agent is exemplified. Examples thereof include tetramethyl ammonium chloride, tetraethyl ammonium chloride tetramethyl ammonium hydroxide, and tetraethyl ammonium hydroxide.

Rust Preventive Agent

Examples of the rust preventive agent include ethanolamine compounds such as N,N-diethyl ethanolamine, N,N-dimethyl ethanolamine, and aminoethyl ethanolamine.

EXAMPLE

Hereinafter, the present invention will be described with reference to an example. However, the scope of the invention is not limited thereto. In the example, "%" is used and means "% by mass" otherwise specifically noted.

Preparation of New Abrasive Slurry

Each of the following additives is prepared and mixed, and then dispersed with a homogenizer to prepare a new abrasive slurry.

Abrasive: cerium oxide abrasive 10.0 g

Additive A-1: ammonium salt of polyacrylic acid (dispersant) 0.200 g

Additive B-1: benzethonium chloride (preservative) 0.0500 g

Pure water to a total amount of 1.00 L

Preparation of Recycled Abrasive Slurry

Preparation of Recycled Abrasive Slurry 1

With the filtration device illustrated in FIG. 3, the additive A and the additive B were removed from the prepared new abrasive slurry so that the concentrations thereof were reduced to be 1/100, and then water was added thereto so as to prepare a recycled abrasive slurry 1 (filtered abrasive slurry) having an abrasive concentration of 1.0% by mass. As the filter of the filtration device, "Cefilt" (pore size: 0.8 μm), a ceramic filter manufactured by NGK INSULATORS. LTD., was used. The composition of the recycled abrasive slurry 1 (filtered abrasive slurry) is as follows. The additive was not added. The electrical conductivity of the prepared recycled abrasive slurry 1 was 0.001 (mS/cm) at 25° C. The electrical conductivity was measured with a compact conductivity meter, LAQUAtwin B-771, (manufactured by HORIBA, Ltd.) for a sample solution of which the temperature has been controlled to be 25° C.

Abrasive: cerium oxide abrasive 10.0 g

Additive A-1: ammonium salt of polyacrylic acid (dispersant) 0.002 g

Additive B-1: benzethonium chloride (preservative) 0.0005 g

Pure water to a total amount of 1.00 L

Preparation of Recycled Abrasive Slurry 2

A recycled abrasive slurry 2 was prepared in the same manner as that for the recycled abrasive slurry 1 (filtered abrasive slurry) except for further adding the additive B-1 in an amount of 0.045 g/L to the prepared recycled abrasive slurry 1 (filtered abrasive slurry).

The content ratios of the additive A and the additive B in the recycled abrasive slurry 2 are 0.01 and 0.91, respectively, with respect to the new abrasive slurry. The electrical conductivity of the prepared recycled abrasive slurry 2 was 0.061 (mS/cm) at 25° C.

Preparation of Recycled Abrasive Slurry 3

A recycled abrasive slurry 3 was prepared in the same manner as that for the recycled abrasive slurry 1 (filtered abrasive slurry) except for further adding tetramethyl ammonium chloride (antibacterial agent, additive B-2) as the additive B in an amount of 0.045 g/L to the prepared recycled abrasive slurry 1 (filtered abrasive slurry).

The content ratio of the additive A-1 and a total amount of the additives B-1 and B-2 are 0.01 and 0.91, respectively, in the recycled abrasive slurry 3 with respect to the new abrasive slurry. The electrical conductivity of the prepared recycled abrasive slurry 3 was 0.061 (mS/cm) at 25° C.

Preparation of Recycled Abrasive Slurry 4

A recycled abrasive slurry 4 was prepared in the same manner as that for the recycled abrasive slurry 1 (filtered abrasive slurry) except for further adding the additive A in an amount of 0.014 g/L to the prepared recycled abrasive slurry 1 (filtered abrasive slurry).

The content ratios of the additive A and the additive B in the recycled abrasive slurry 4 are 0.08 and 0.01, respectively, with respect to the new abrasive slurry. The electrical conductivity of the prepared recycled abrasive slurry 4 was 0.006 (mS/cm) at 25° C.

Preparation of Recycled Abrasive Slurries 5 to 11

Recycled abrasive slurries 5 to 11 were prepared in the same manner as that for the recycled abrasive slurry 4 except that the amount of the additive A-1 further added was changed from the amount used in the prepared recycled abrasive slurry 4 to respective amounts listed in Table 1.

Preparation of Recycled Abrasive Slurry 12

With the filtration device illustrated in FIG. 3, the additive A and the additive B were removed from the prepared new abrasive slurry so that the concentrations thereof were reduced to be 1/50, and then water was added thereto so as to prepare a filtered abrasive slurry having an abrasive concentration of 1.0% by mass.

Then, the additive A was further added thereto in an amount of 0.080 g/L so as to prepare a recycled abrasive slurry 12. The content ratios of the additive A and the additive B in the recycled abrasive slurry 12 are 0.90 and 0.50, respectively, with respect to the new abrasive slurry. The electrical conductivity of the prepared recycled abrasive slurry 12 was 0.092 (mS/cm) at 25° C.

Preparation of Recycled Abrasive Slurry 13

With the filtration device illustrated in FIG. 3, the additive A and the additive B were removed from the prepared new abrasive slurry so that the concentrations thereof were reduced to be 1/10, and then water was added thereto so as to prepare a filtered abrasive slurry having an abrasive concentration of 1.0% by mass.

Then, the additive A was further added thereto in an amount of 0.010 g/L so as to prepare a recycled abrasive slurry 13. The content ratios of the additive A and the additive B in the recycled abrasive slurry 13 are 1.00 and 0.90, respectively, with respect to the new abrasive slurry. The electrical conductivity of the prepared recycled abrasive slurry 13 was 0.125 (mS/cm) at 25° C.

Preparation of Recycled Abrasive Slurries 14 to 19

Recycled abrasive slurries 14 to 19 were prepared in the same manner as that for the recycled abrasive slurry 7 except that the additive A-1 used in the prepared recycled abrasive slurry 7 was changed to respective additives A-2 to A-7 described below.

Additive A-2: triethanolamine lauryl sulfate (anionic dispersant)

Additive A-3: polyethylene polyamine fatty acid amide (cationic dispersant)

Additive A-4: polyoxyethylene lauryl ether (nonionic dispersant)

Additive A-5: N,N-dimethyl-N-alkyl-N-carboxymethyl ammonium betaine (betaine-type dispersant)

Additive A-6: isopropylamine (polishing rate selectivity improver)

Additive A-7: 1-propanol (detergent)

Preparation of Recycled Abrasive Slurry 20

A recycled abrasive slurry 20 was prepared in the same manner as that for the recycled abrasive slurry 7 except that instead of the additive B-1 used in the prepared recycled abrasive slurry 7, the same amount of tetramethyl ammonium chloride (antibacterial agent, additive B-2) was used. The electrical conductivity of the prepared recycled abrasive slurry 20 was 0.034 (mS/cm) at 25° C.

With regard to the additives A-1 to A-7 used as described above, all of the polishing rate ratios thereof measured by the above-described method were 1.02 or greater. The polishing rate ratios of the additives B-1 and B-2 were less than 1.00.

Quantification of Additive A and Additive B in Each Abrasive Slurry

The additive A and the additive B were quantified as follows: with the use of a high-performance liquid chromatography (HPLC) system manufactured by Shimadzu Corporation, a content of each additive was measured for each abrasive slurry having an abrasive particle concentration adjusted to be 1.0% by mass.

Measurement of Polishing Rate

Measurement of Polishing Rate of New Abrasive Slurry

With the polishing machine illustrated in FIG. 1, a surface to be polished was polished with an abrasive cloth while supplying the prepared new abrasive slurry to the surface to be polished. The new abrasive slurry was supplied in a circulatory manner at a flow rate of 5 L/min, to perform polishing processing. A glass substrate of 65 mmΦ was used as a material to be polished, and an abrasive cloth made from polyurethane was used. Pressure against the surface to be polished upon polishing was adjusted to be 9.8 kPa (100 g/cm$^2$), the rotation speed of the polishing machine was set to 100 min$^{-1}$ (rpm), and then polishing processing was performed for 30 minutes. The thickness of the glass substrate, before and after the polishing, was measured with a Nikon Digimicro (MF501), a polishing amount per minute (μm) was calculated from thickness displacement to measure a polishing rate (μm/min), and the polishing rate was set at 1.00.

Measurement of Polishing Rates of Recycled Abrasive Slurries 1 to 20

Polishing rates of the recycled abrasive slurries 1 to 20 were measured in the same manner as that described above, and relative polishing rates were obtained based on the polishing rate of the new abrasive slurry set at 1.00 as a reference. The obtained results are indicated in Table 1.

TABLE 1

| Recycled abrasive slurry No. | Kind of additive | | Filtered abrasive slurry (f) | | | Amount of additive added (g) | | Recycled abrasive slurry (h) |
|---|---|---|---|---|---|---|---|---|
| | Additive A | Additive B | Content of additive A [g/L] | Content of additive B [g/L] | Filtration rate | Content of additive A [g/L] | Content of additive B [g/L] | Content of additive A [g/L] |
| New | A-1 | B-1 | 0.200 | 0.0500 | Reference | 0 | 0 | 0.200 |
| 1 | A-1 | B-1 | 0.002 | 0.0005 | 1/100 | 0 | 0 | 0.002 |
| 2 | A-1 | B-1 | 0.002 | 0.0005 | 1/100 | 0 | 0.045 | 0.002 |
| 3 | A-1 | B-2 | 0.002 | 0.0005 | 1/100 | 0 | 0.045 | 0.002 |
| 4 | A-1 | B-1 | 0.002 | 0.0005 | 1/100 | 0.014 | 0 | 0.016 |
| 5 | A-1 | B-1 | 0.002 | 0.0005 | 1/100 | 0.020 | 0 | 0.022 |
| 6 | A-1 | B-1 | 0.002 | 0.0005 | 1/100 | 0.050 | 0 | 0.052 |
| 7 | A-1 | B-1 | 0.002 | 0.0005 | 1/100 | 0.098 | 0 | 0.100 |
| 8 | A-1 | B-1 | 0.002 | 0.0005 | 1/100 | 0.178 | 0 | 0.180 |
| 9 | A-1 | B-1 | 0.002 | 0.0005 | 1/100 | 0.198 | 0 | 0.200 |
| 10 | A-1 | B-1 | 0.002 | 0.0005 | 1/100 | 0.218 | 0 | 0.220 |
| 11 | A-1 | B-1 | 0.002 | 0.0005 | 1/100 | 9.998 | 0 | 10.000 |
| 12 | A-1 | B-1 | 0.100 | 0.0250 | 1/50 | 0.080 | 0 | 0.180 |
| 13 | A-1 | B-1 | 0.190 | 0.0450 | 1/10 | 0.010 | 0 | 0.200 |
| 14 | A-2 | B-1 | 0.002 | 0.0005 | 1/100 | 0.098 | 0 | 0.100 |
| 15 | A-3 | B-1 | 0.002 | 0.0005 | 1/100 | 0.098 | 0 | 0.100 |
| 16 | A-4 | B-1 | 0.002 | 0.0005 | 1/100 | 0.098 | 0 | 0.100 |
| 17 | A-5 | B-1 | 0.002 | 0.0005 | 1/100 | 0.098 | 0 | 0.100 |
| 18 | A-6 | B-1 | 0.002 | 0.0005 | 1/100 | 0.098 | 0 | 0.100 |
| 19 | A-7 | B-1 | 0.002 | 0.0005 | 1/100 | 0.098 | 0 | 0.100 |
| 20 | A-1 | B-2 | 0.002 | 0.0005 | 1/100 | 0.098 | 0 | 0.100 |

| Recycled abrasive slurry No. | Recycled abrasive slurry (h) | | | Content ratio | | Relative polishing rate | Remarks |
|---|---|---|---|---|---|---|---|
| | Content of additive B [g/L] | Electrical conductivity [mS/cm] | | Additive A | Additive B | | |
| New | 0.0500 | 0.066 | | 1.00 | 1.00 | 1.00 | Reference |
| 1 | 0.0005 | 0.001 | | 0.01 | 0.01 | 0.95 | Comparative example |
| 2 | 0.0455 | 0.061 | | 0.01 | 0.91 | 0.85 | Comparative example |
| 3 | 0.0455 | 0.061 | | 0.01 | 0.91 | 0.87 | Comparative example |
| 4 | 0.0005 | 0.006 | | 0.08 | 0.01 | 1.05 | Present invention |
| 5 | 0.0005 | 0.008 | | 0.11 | 0.01 | 1.13 | Present invention |
| 6 | 0.0005 | 0.018 | | 0.26 | 0.01 | 1.19 | Present invention |
| 7 | 0.0005 | 0.034 | | 0.50 | 0.01 | 1.28 | Present invention |
| 8 | 0.0005 | 0.060 | | 0.90 | 0.01 | 1.30 | Present invention |
| 9 | 0.0005 | 0.067 | | 1.00 | 0.01 | 1.28 | Present invention |
| 10 | 0.0005 | 0.073 | | 1.10 | 0.01 | 1.21 | Present invention |
| 11 | 0.0005 | 3.333 | | 50.00 | 0.50 | 1.06 | Present invention |
| 12 | 0.0250 | 0.092 | | 0.90 | 0.50 | 1.19 | Present invention |
| 13 | 0.0455 | 0.125 | | 1.00 | 0.90 | 1.09 | Present invention |
| 14 | 0.0005 | 0.034 | | 0.50 | 0.01 | 1.24 | Present invention |
| 15 | 0.0005 | 0.034 | | 0.50 | 0.01 | 1.26 | Present invention |
| 16 | 0.0005 | 0.034 | | 0.50 | 0.01 | 1.28 | Present invention |
| 17 | 0.0005 | 0.034 | | 0.50 | 0.01 | 1.27 | Present invention |
| 18 | 0.0005 | 0.034 | | 0.50 | 0.01 | 1.25 | Present invention |
| 19 | 0.0005 | 0.034 | | 0.50 | 0.01 | 1.30 | Present invention |
| 20 | 0.0005 | 0.034 | | 0.50 | 0.01 | 1.28 | Present invention |

Concentration of abrasive particles: 10 g/L

As is clear from the results described in Table 1, the recycled abrasive slurries according to an embodiment of the present invention have higher polishing rates in comparison to those of comparative examples. The recycled abrasive slurries according to an embodiment of the present invention have been prepared by collecting an abrasive slurry obtained in a polishing step, removing each additive by a filtration operation, and then adding a predetermined concentration of the additive A.

According to an embodiment of the present invention, it is possible to provide a method for preparing a recycled abrasive slurry with excellent polishing properties, in which slurry, a component which decreases a polishing rate is reduced, and a component which improves a polishing rate is included at a desired concentration.

The reason why the polishing property-improving effect is exerted in the present invention is presumed as follows.

In an abrasive slurry before collection (hereinafter also referred to as "new abrasive slurry"), for example, an additive (additive B) such as an antibacterial agent and a preservative is included together with an abrasive (abrasive grain) as a main component in order to secure storage stability of the abrasive slurry until the use thereof in a polishing step. In addition, for the purpose of improving polishing efficiency of the abrasive at polishing, an additive (additive A) such as a dispersant for maintaining dispersion stability of abrasive particles, and a detergent for the surface of a material to be polished, is included.

With the use of an abrasive slurry having the composition described above, a surface of a material to be polished, which includes silicon as a main component, is polished. Thereafter, the abrasive slurry after polishing is collected as a collected abrasive slurry. The collected abrasive slurry includes, besides the abrasive, the additive A, and the additive B, shavings of the material to be polished caused by the polishing operation, and chips of a pad for holding the material to be polished in the polishing step. It is important that, among these, components other than the abrasive as an active component and the additive A effective for improving a polishing rate are removed before preparing a recycled abrasive slurry. Regarding the additive B, since many of them are compounds having adverse effects on a polishing rate, the additive B is an unnecessary additive for a recycled abrasive slurry with a short cycle of use.

Therefore, in a method for preparing a recycled abrasive slurry according to an embodiment of the present invention, as a first step, a collected abrasive slurry collected after polishing is subjected to separation with a removing unit with which the abrasive particles are captured and other components including the additive A, the additive B and the material to be polished are passed through, such as a filter, thereby reducing the concentrations of the additive A and the additive B included in the abrasive-including recycled slurry to be in a range of $1/500$ to $1/2$.

By this operation, in particular, the additive B unnecessary for a recycled abrasive slurry can be removed. Next, since the additive A has been simultaneously removed, as a second step, a predetermined amount of the additive A, which is effective in the abrasive slurry, is newly replenished thereto. By doing so, a recycled abrasive slurry having a desired polishing rate can be obtained, and the abrasive, which is precious resources, can be used effectively. On that occasion, regarding the additive A, the additive A (also referred to as additive $A_1$) included in a new slurry and the additive A (also referred to as additive $A_2$) added in step 2 may be additives of the same kind, or, may be additives of different kinds from each other as long as the additives are compounds capable of increasing a polishing rate.

Although the present invention has been described and illustrated in detail, it is clearly understood that the same is by way of illustrated and example only and is not to be taken byway of limitation, the scope of the present invention being interpreted by terms of the appended claims.

What is claimed is:

1. A method for preparing a recycled abrasive slurry, the method comprising:
    polishing a material to be polished, which includes silicon as a main component, with an abrasive slurry including a plurality of kinds of additives added for different purposes; and
    preparing a recycled abrasive slurry from a collected abrasive slurry collected after the polishing, wherein the recycled abrasive slurry is prepared through:
    step 1 of removing, from the collected abrasive slurry, at least an additive B capable of decreasing a polishing rate among the plurality of additives, and
    step 2 of adding at least an additive A capable of increasing a polishing rate among the plurality of additives, to the abrasive slurry from which at least an additive has been removed, which has been prepared in step 1,
    wherein the additive B is a preservative, a rust preventive agent, or an antibacterial agent.

2. The method for preparing a recycled abrasive slurry according to claim 1, wherein the abrasive slurry before collection includes the additive A and the additive B, and wherein, for preparing the recycled abrasive slurry, the additive A and the additive B are removed in step 1 to the extent that the contents thereof are reduced to be in a range of $1/500$ to $1/2$ of respective contents thereof in the abrasive slurry before collection.

3. The method for preparing a recycled abrasive slurry according to claim 1, wherein the abrasive slurry before collection includes the additive A, and wherein an amount of the additive A added in step 2 is in a range of 10% by mass to 5000% by mass with respect to the amount of the additive A included in the abrasive slurry before collection.

4. The method for preparing a recycled abrasive slurry according to claim 1, wherein the additive A is a dispersant or a detergency improver.

5. The method for preparing a recycled abrasive slurry according to claim 1, wherein an amount of the additive A added in step 2 is determined based on a measured value of electrical conductivity of the abrasive slurry from which an additive has been removed.

6. The method for preparing a recycled abrasive slurry according to claim 1, wherein the additive A is added in step 2 to the abrasive slurry from which at least an additive has been removed under a condition that a value of electrical conductivity of the recycled abrasive slurry is adjusted to be in a range of 0.05 to 100 times greater than a value of electrical conductivity of the abrasive slurry before collection.

\* \* \* \* \*